United States Patent [19]

Bloom et al.

[11] 4,098,301

[45] Jul. 4, 1978

[54] METHOD TO PROVIDE HOMOGENEOUS LIQUID CRYSTAL CELLS CONTAINING A DYESTUFF

[75] Inventors: Allen Bloom, East Windsor; Howard Sorkin, Berkeley Heights, both of N.J.

[73] Assignee: RCA Corporation, New York, N.Y.

[21] Appl. No.: 753,879

[22] Filed: Dec. 23, 1976

[51] Int. Cl.² .................. G02F 1/13; C09K 3/34; B65B 31/02
[52] U.S. Cl. ..................... 141/7; 252/299; 350/349; 141/11
[58] Field of Search .......... 252/299, 408 LC; 350/160 LC; 141/7, 8

[56] References Cited

U.S. PATENT DOCUMENTS

| 3,597,044 | 8/1971 | Castellano | 252/299 |
| 3,698,449 | 10/1972 | Sorkin et al. | 252/299 |
| 3,799,651 | 3/1974 | Janning | 350/160 LC |
| 3,833,287 | 9/1974 | Taylor et al. | 350/160 LC |
| 3,864,022 | 2/1975 | Moriyama et al. | 252/299 |
| 3,926,502 | 12/1975 | Tanaka et al. | 350/160 LC |
| 3,960,750 | 6/1976 | Moriyama et al. | 252/299 |
| 3,960,751 | 6/1976 | Moriyama et al. | 252/299 |
| 4,007,077 | 2/1977 | Yaguchi | 350/160 LC |
| 4,032,219 | 6/1977 | Constant et al. | 252/299 |
| 4,032,470 | 6/1977 | Bloom et al. | 252/299 |

FOREIGN PATENT DOCUMENTS 2,233,680  1/1974  Fed. Rep. of Germany ....... 252/299

*Primary Examiner*—Benjamin R. Padgett
*Assistant Examiner*—T. S. Gron
*Attorney, Agent, or Firm*—H. Christoffersen; Birgit E. Morris

[57] ABSTRACT

Filled liquid crystal cells containing a soluble, pleochroic dyestuff are treated by heating above the nematic to isotropic liquid transition temperature until the cells appear uniformly colored.

3 Claims, 3 Drawing Figures

METHOD TO PROVIDE HOMOGENEOUS LIQUID CRYSTAL CELLS CONTAINING A DYESTUFF

This invention relates to a method of improving the appearance of liquid crystal display devices containing a dyestuff. More particularly, this invention relates to a method of homogenizing liquid crystal compositions and dyestuffs in filled liquid crystal cells.

BACKGROUND OF THE DISCLOSURE

Liquid crystal electrooptic devices are well known. The devices comprise a layer of liquid crystal material filling the space formed between two parallel electrodes, e.g., glass plates coated with a thin, conductive film, such as of tin oxide or indium oxide. The liquid crystal material is aligned in a particular direction with respect to the electrode plates. When a voltage is applied to the electrodes, the liquid crystal molecules realign.

Dynamic scattering liquid crystal cells contain liquid crystal compositions having negative dielectric anisotropy. These compounds, originally aligned perpendicularly to the electrodes, become turbulent in an electric field, thereby scattering light.

Field effect liquid crystal cells contain liquid crystal materials having positive dielectric anisotropy. These compounds, originally aligned in a direction parallel to the electrodes, realign in a direction perpendicular to the electrodes in an electric field. This phenomenon is made visible by a polarizer and analyzer external to the cell.

In order to optimize the contrast between the "on" and "off" states, it is desirable to maximize the original alignment of the liquid crystal material. This has been done in several ways; for field effect cells, the electrode plates can be rubbed or scratched in a single direction prior to fabricating the cell, or, preferably they can be given a thin, slant evaporated coating, as of a silicon oxide, which does not interfere with the electrodes but which does form a series of microgrooves along which the liquid crystal molecules sympathetically align.

A homeotropic aligning agent is generally added to dynamic scattering liquid crystal compositions in order to improve the original alignment. This is a chemical agent which improves the wettability between the electrode plates and the liquid crystal composition. Such aligning agents are well known in the art.

After preparing the electrode plates, two of them are cemented together with a seal for each cell, preferably a glass frit seal, leaving a single opening as a fill port. The cell is filled by evacuating the cell and immersing in a reservoir of the desired liquid crystal material. A preferred method of filling dynamic scattering liquid crystal cells containing an aligning agent is disclosed in U.S. Pat. No. 4,064,919 of Stern et al, incorporated herein by reference.

When a dyestuff is added to the liquid crystal material and the liquid crystal cell is vacuum filled, difficulty is encountered in maintaining a homogeneous mixture in the cell. The dyestuff tends to concentrate in areas around the fill port, causing visible inhomogeneities in the color of the cell which detracts objectionably from its appearance. Further, upon standing, a localized high concentration of dye tends to precipitate out of solution. Thus it would be desirable to find a method of improving the homogeneity and stability of liquid crystal — dyestuff mixtures in liquid crystal cells.

SUMMARY OF THE INVENTION

We have found that by heating liquid crystal cells containing a mixture of a liquid crystal composition and a soluble pleochroic dyestuff above the nematic to isotropic liquid transition temperature of the liquid crystal, the mixture of the liquid crystal and dyestuff becomes and remains homogeneous.

DETAILED DESCRIPTION OF THE INVENTION

Liquid crystal compositions are well known. Since most liquid crystal compounds have only a limited mesomorphic temperature range, generally several liquid crystals are mixed together to broaden that range. Liquid crystals having negative dielectric anisotropy may be admixed with liquid crystals having positive dielectric anisotropy.

Commercial liquid crystal dynamic scattering cells contain mixtures of liquid crystals having negative dielectric anisotropy. For example, mixtures of p-alkoxybenzylidene-p'-alkylanilines, and particularly eutectic mixtures thereof, are useful for room temperature operations. For field effect cells, this eutectic mixture can be combined with strongly positive dielectric anisotropy materials, such as p-alkoxybenzylidene-p'-cyanoanilines described in U.S. Pat. No. 3,499,702. Other known positive anisotropy liquid crystals include p-substituted biphenyl(p-nitrophenyl)carboxylates, described in U.S. Pat. No. 3,925,238, p-substituted-(6-cyano-2-naphthyl)-benzoates described in U.S. Pat. No. 3,925,237 and p-substituted-p'-(4-cyano-4'-biphenyl)benzoates described in U.S. Pat. No. 3,951,846. Numerous other nematic liquid crystal materials are well known to those skilled in the art.

Various pleochroic dyestuffs that are soluble in liquid crystals are also known. They are employed to impart certain colors to liquid crystal materials or to improve the contrast between the "on" and "off" states. Known pleochroic dyestuffs for liquid crystals include compounds of the formula

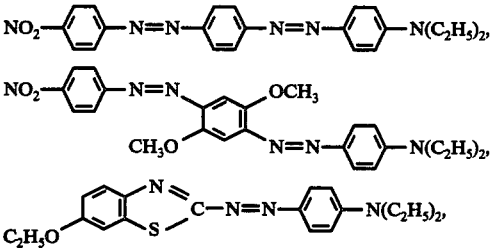

N,N'-dimethyl indigo, N,N'-dipalmitoyl indigo, p-nitrobenzylidinephenylhydrozone, 4-butoxybenzylidine-4'- amino-4″-nitroazobenzene, indophenol blue, 2-amino-8-hydroxy-1-azonaphthyl-4′-benzonitrile and the like.

Advantageously, a chiral aligning agent can also be added to field effect liquid crystal mixtures to insure uniform alignment of the liquid crystal molecules in a single direction. Suitable aligning agents include cholesterol derivatives such as cholesteryl halides, cholesteryl esters and the like; optically active compounds such as d- or l-alpha-pinene, d- or l-octanol and chiral esters such as 4-propylphenyl-4′-(4″-2-methylbutylphenyl-carboxy)2-chlorobenzoate and the like. In general from about 0.05 to about 2.0% by weight of the liquid crystal composition of the chiral aligning agent is suitable.

Dynamic scattering liquid crystal compositions may also include a resistivity dopant, i.e., soluble ionic organic compounds that can regulate the resistivity of the liquid crystal mixture to within a range from about $10^8$ to $5 \times 10^{10}$ ohm-cm. Homeotropic aligning agents are usually included as noted hereinabove.

Figure 1:
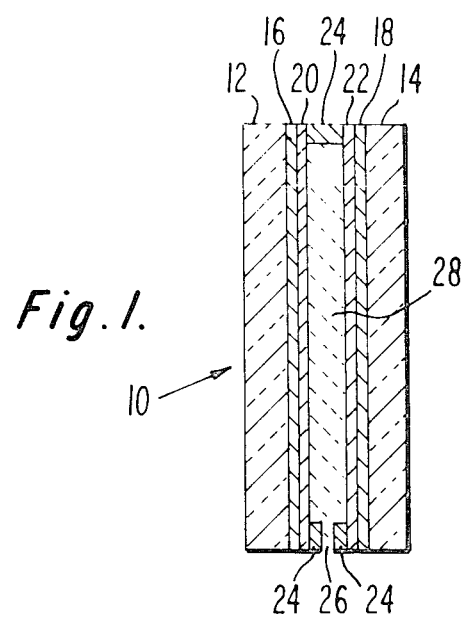
FIG. 1 is a sectional view of a liquid crystal cell useful in the method of the invention.

The liquid crystal mixture containing the desired dyestuff is placed in a vacuum chamber and one or more liquid crystal cells having a single fill port, as in FIG. 1, suspended over the composition. The chamber is evacuated and the cell is immersed in the liquid crystal composition to fill the cells. The cells are then wiped dry of any residual liquid crystal composition and the fill port is sealed. One method of sealing the cell is described in copending application of Horsting et al, Ser. No. 638,849 filed Dec. 8, 1975 whereby a metal film is first sputtered on the fill port and then sealed with solder.

The cells, now generally inhomogeneous by visual inspection, are heated to a temperature above the nematic to isotropic mesomorphic transition temperature of the liquid crystal composition. The exact temperature is not critical, provided the composition is heated at least until it is an isotropic liquid. Too high a temperature is of course undesirable as it may degrade the liquid crystal - dye composition. The heating time is not critical either, although a time of about 5 to about 30 minutes is generally sufficient. Once the liquid crystal cell has become uniform in appearance, no precipitation of the dyestuff or further separation of the ingredients occurs.

The invention will be further illustrated by the following examples but it is to be understood that the invention is not meant to be limited to the details described therein. In the examples percentages are by weight.

EXAMPLE 1

A liquid crystal composition having positive dielectric anisotropy was prepared from a mixture of equimolar amounts of p-methoxybenzylidene-p′-butylaniline (MBBA) and p-ethoxybenzylidine-p′-butylaniline (EBBA) to which 10% of p-butoxybenzylidine-p′-cyanoaniline was added. About 0.1% of cholesteryl nonanoate was added as a chiral aligning agent. The dyestuff

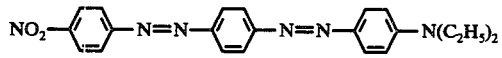

was added to the liquid crystal in an amount of 2.28% until a homogeneous mixture was obtained.

The above mixture was heated above its nematic to isotropic transition temperature (85° C.) and charged to a vacuum chamber. Several liquid crystal cells as in FIG. 1 were suspended over the mixture. The chamber was evacuated and the cells immersed in the liquid crystal - dye mixture to fill them.

Referring to FIG. 1, a liquid crystal cell 10 comprises two glass plates 12 and 14 each having a thin, conductive film, e.g. of tin oxide or indium oxide, 16 and 18 respectively, to form the electrodes thereon. The electrode film can be patterned for digital or other display. Thin layers of a slope evaporated silicon oxide film 20 and 22 were deposited over the electrode films 16 and 18 respectively. A glass frit seal 24 extends along the periphery of the plates 12 and 14 except for a single fill port 26. The desired liquid crystal composition 28 fills the space defined by the plates 12 and 14.

Figure 2:
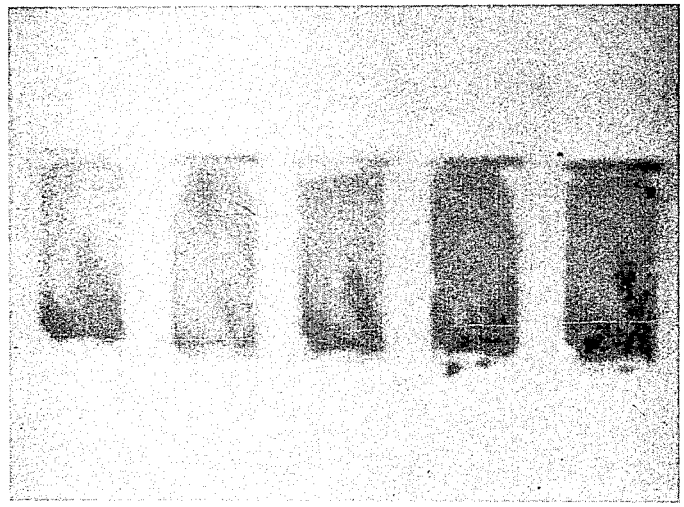
FIG. 2 is a photograph of liquid crystal cells filled with a liquid crystal mixture and a pleochroic dyestuff in conventional manner.

When the cells as above were removed from the vacuum chamber, they appeared very non-uniform. The concentration of the dye was much higher around the fill port than in other portions of the cell. The appearance of the cells can be viewed in the photograph of FIG. 2.

Figure 3:
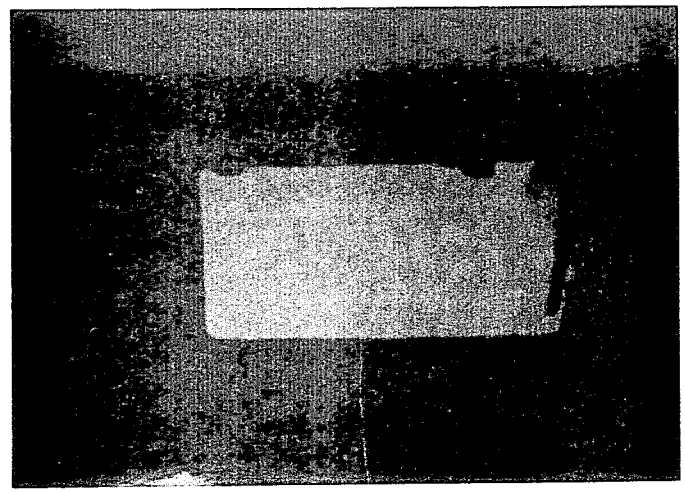
FIG. 3 is a photograph of liquid crystal cells filled with a liquid crystal mixture and a pleochroic dyestuff treated according to the present method.

One cell was then heated at 85° C for 5 minutes. The cell now appeared uniform, the color of the whole cell now taking on the intensity of color of the darker areas prior to heating. The heated cell can be viewed in the photograph of FIG. 3. After standing for 5 days, the dyestuff in the concentrated dark areas of the untreated cells precipitated out, leading to more serious cosmetic defects. The cells were heated at 85° C for 30 minutes. All of the precipitated dye redissolved and a uniformly colored cell was obtained.

EXAMPLE 2

2.28% of the dye

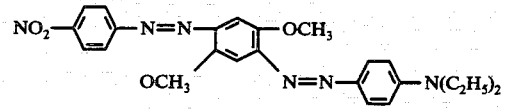

was added to the liquid crystal composition of EXAMPLE 1. The resultant mixture was used to fill liquid crystal cells as in FIG. 1. The filled cells were non-uniform in color, being darker around the fill ports.

The cells were heated at 85° C for 30 minutes. Uniformly colored cells were obtained.

EXAMPLE 3

0.98% of the dyestuff

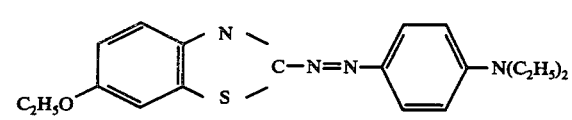

was added to the liquid crystal composition of EXAMPLE 1 and the resultant mixture used to fill liquid crystal cells as in FIG. 1. The filled cells were non-uniform in color, being deeply colored around the fill port, the edges of the cell and the periphery of the pattern of the electrodes. The remaining approximately 50% by volume of the cell was barely tinted.

The cell was heated at 102° C for 10 minutes. A uniform, deeply colored cell was obtained.

Thus the heat treatment of the invention is effective to render and to maintain liquid crystal cells containing a liquid crystal material and a pleochroic dyestuff homogeneous in composition. This result is surprising because even cells that have been filled while the liquid crystal mixture is at a temperature above the nematic to isotropic transition temperature tend to separate on filling and the dyestuff tends to separate out on standing. When the cells are heated after filling however, the cell obtains and retains uniformity with no precipitation of dyestuff, even after months of storage.

What is claimed is

1. A method of improving the homogeneity of liquid crystal cells containing mixtures of a liquid crystal composition and a soluble, pleochroic dyestuff filled under vacuum through a single port which comprises heating a filled cell to a temperature above the nematic to isotropic transition temperature of the liquid crystal mixture until a uniform color is obtained throughout the cell.

2. A method according to claim 1 wherein the liquid crystal composition has positive dielectric anisotropy.

3. A method according to claim 1 wherein the liquid crystal composition has negative dielectric anisotropy.